Jan. 20, 1959 J. KAUTZKY 2,869,209
ROD HOLDING DEVICE
Filed July 31, 1957

Witness
Edward P. Seeley

Inventor
Joe Kautzky
by M. Talbert Tief
Attorney

United States Patent Office 2,869,209
Patented Jan. 20, 1959

2,869,209

ROD HOLDING DEVICE

Joe Kautzky, Fort Dodge, Iowa

Application July 31, 1957, Serial No. 675,456

6 Claims. (Cl. 24—249)

This invention relates to a device for detachably supporting rods and more particularly to a means for vertically holding fishermen's casting rods, fly rods, poles, and like.

One of the most necessary and expensive tools of a fisherman is his fishing rod. When not in use, they pose a problem in storage. Usually they are placed in the corner of some closet where they are often damaged or broken. Furthermore, they have a tendency to warp and become crooked. Some effort has been made to hang them from a nail on the wall but, while this is advantageous in keeping them straight, they are difficult to place on the nail and often are accidentally knocked down.

Therefore, one of the principal objects of my invention is to provide a wall device that will successfully hold rod members in vertical positions without accidental detachment.

A further object of this invention is to provide a rod holding device that permits rapid placement or removal of the rod.

A still further object of this invention is to provide a rod holder that does not mar nor damage the rod being held.

Still further objects of my invention are to provide a device for vertically supporting rods that is economical in manufacture, durable in use, and refined in appearance.

These and other objects will be apparent to those skilled in the art.

Figure 1:
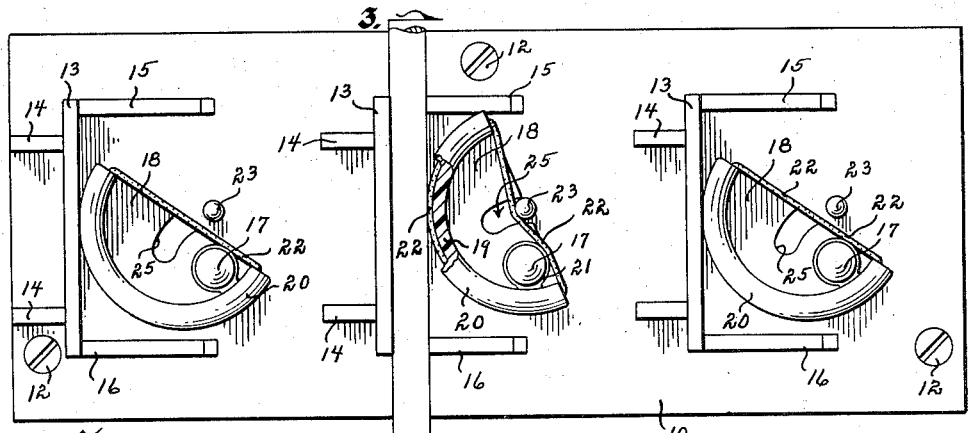
Figure 2:
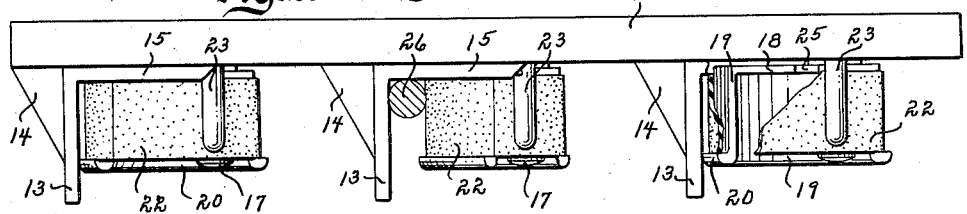
Figure 3:
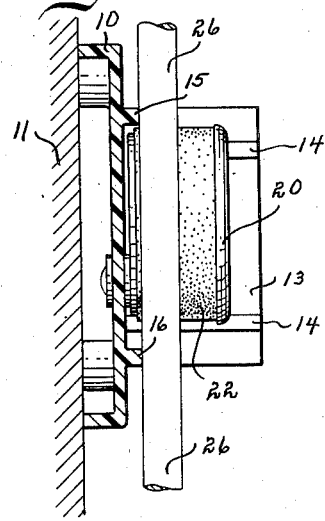
Figure 4:
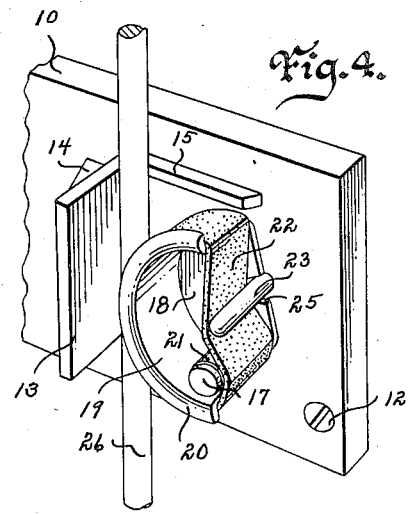

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a front view of my device in use and with a section cut away to more fully illustrate its construction, Fig. 2 is a top plan view of my rod holder with a section cut away, Fig. 3 is a cross sectional view of the device taken on line 3—3 of Fig. 1, and Fig. 4 is a perspective view of one of the units supporting a fishing rod.

While I describe my device as a fisherman's rod or pole holder, obviously it may be used successfully to hold various elongated handles, bars, pipes, and the like.

In the drawings, I have used the numeral 10 to designate the flat base portion of my device which is adapted to be secured to a vertical wall 11 by screws or the like 12. This base has three units for holding three rods. Inasmuch as each of the three units are identical, I will use like numerals for each. My device may be made with only one of these units, or it may be made with any desired practical number of units. The numeral 13 designates a vertical ledge fin on the face of the base 10 and which extends perpendicular to the base 10, as shown in Fig. 2. This vertical ledge or shoulder may have brace webbing 14 on its left side. The numerals 15 and 16 designate two spaced apart horizontal bars on the base of the base 10 and which extend from and to the right of the vertical ledge 13. Between the two bars is a headed horizontal projecting pin shaft 17. Rotatably eccentrically mounted on this pin shaft is a one-half wheel having a one-half wheel web 18, a one-half circular wheel rim 19 and an outwardly extending rim flange 20 on the wheel rim, as shown in Fig. 4. The pin shaft extends through the lower area of the web 18 and through an axle hub 21 of the one-half eccentrically mounted wheel. The pin shaft is so positioned on the base and relative to the ledge 13 that the eccentrically mounted one-half wheel, when rotated to the left, will strike the ledge 13, and thus be prevented from further rotation to the left, as shown in Fig. 1. While the one-half wheel is only permitted limited rotation, it will be extending upwardly and to the left from its fixed pin shaft. The numeral 25 designates an arcual open slot in the webbing 18 concentric with the pin shaft and located above and to the left of the pin shaft. The numeral 23 designates a horizontal stop post on the face of the base 10 and capable of entering the open end slot 25 when the one-half wheel is rotated to the right. The numeral 22 designates an ordinary flexible resilient continuous belt of rubber or the like material and may be that of an ordinary wide rubber band. This band is extended around the one-half wheel. Thus, it will, for one part of its length, engage the flat one-half of the flat tread rim 19, and its other part will stretch between the two ends of the one-half wheel rim 19 in substantially a straight line, as shown in Fig. 1. This latter part will pass to the left of the stop post 23 and the part of the belt band 22 that engages the rim 19 will be back of the retaining flange rim 20. To place a rod, or the like 26, into holding position, it is merely necessary to move the rod length toward and upwardly to the right side of the ledge 13. This action will rotate the one-half wheel member upwardly and to the right and away from the ledge 13. The rod will be guided by and slip over the rim 20 and into place between the ledge 13 and that part of the rubber band belt that embraces the one-half wheel rim. This action is guided by the fact that the ledge 13 extends outwardly beyond the plane of the one-half wheel member, as shown in Fig. 3. By releasing the rod, the one-half wheel member will, by gravity, rotate to the left, thereby wedging the rod between the rubber band on the one-half eccentrically mounted wheel and the ledge 13. The weight pull of the rod will accelerate this clamping action. However, there is a third means for holding the one-half wheel to the left in its arc of rotation and that is a yielding force by the rubber band engaging the post 23 when the one-half wheel is rotated to the right, and as shown in the center unit of Fig. 1. This yielding action holds the one-half wheel member into wedge engagement with the rod. The bars 15 and 16 will hold the rod from engagement with the base and are particularly desirable if the rod is of tapered construction. The rubber belt band, therefore, serves two purposes, i. e., it acts to give yielding traction contact with the rod and also acts as a spring means for yieldingly holding the one-half wheel member to the left in its rotation. To remove the rod, it is merely necessary to move it upwardly and outwardly and free from its position between the ledge and the one-half wheel member. The slot in the one-half wheel web limits the rotation of the wheel to the right, and also permits the rubber band to contact the post 23. The entire device, except the rubber belt bands, may be of molded plastic. In assembling, the one-half wheel members are placed on the pin shafts and the outer ends of the pin shafts then headed to retain the one-half wheel members.

Some changes may be made in the construction and arrangement of my rod holding device without departing from the real spirit and purpose of my invention, and it is my intention to cover by my claims, any modified forms of structure or use of mechanical equivalents which may be reasonably included within their scope.

I claim:

1. In a rod holder, a base, a vertical shoulder ledge on said base, a substantially one-half wheel rotatably eccentrically mounted on said base and at one side of said shoulder ledge; said one-half wheel having substantially a one-half circular rim portion, a continuous flexible resilient belt band having a portion of its length embracing said circular rim portion of said one-half wheel and its other portion extending between the two ends of said circular rim portion in substantially a straight line when not distorted, and a post on said base engageable by that portion of said belt band that extends between the two ends of the said circular rim when said one-half wheel is rotated in a direction away from said ledge shoulder.

2. In a rod holder, a base, a vertical shoulder ledge on said base, a substantially one-half wheel rotatably eccentrically mounted on said base and at one side of said shoulder ledge; said one-half wheel having substantially a one-half circular rim portion, a continuous flexible resilient belt band having a portion of its length embracing said circular rim portion of said one-half wheel and its other portion extending between the two ends of said circular rim portion in substantially a straight line when not distorted, a post on said base engageable by that portion of said belt band that extends between the two ends of the said circular rim when said one-half wheel is rotated in a direction away from said ledge shoulder and a flange rim on the outer edge of said one-half rim portion.

3. In a rod holder, a base, a vertical shoulder ledge on said base, a substantially one-half wheel rotatably eccentrically mounted on said base and at one side of said shoulder ledge; said one-half wheel having substantially a one-half circular rim portion, a continuous flexible resilient belt band having a portion of its length embracing said circular rim portion of said one-half wheel and its other portion extending between the two ends of said circular rim portion in substantially a straight line when not distorted, a post on said base engageable by that portion of said belt band that extends between the two ends of the said circular rim when said one-half wheel is rotated in a direction away from said ledge shoulder and two spaced apart bars on said base extending from that side of said shoulder ledge that is adjacent said one-half wheel.

4. In a rod holder, a base, a vertical shoulder ledge on said base, a substantially one-half wheel rotatably eccentrically mounted on said base and at one side of said shoulder ledge; said one-half wheel having substantially a one-half circular rim portion, a continuous flexible resilient belt band having a portion of its length embracing said circular rim portion of said one-half wheel and its other portion extending between the two ends of said circular rim portion in substantially a straight line when not distorted, and a post on said base engageable by that portion of said belt band that extends between the two ends of the said circular rim when said one-half wheel is rotated in a direction away from said ledge shoulder; said shoulder ledge extending from said base to a point beyond that of the plane of the said one-half wheel.

5. In a rod holder, a base, a vertical shoulder ledge on said base, a substantially one-half wheel rotatably eccentrically mounted on said base and at one side of said shoulder ledge; said one-half wheel having substantially a one-half circular rim portion and substantially one-half web, a continuous flexible resilient belt band having a portion of its length embracing said circular rim portion of said one-half wheel and its other portion extending between the two ends of said circular rim portion in substantially a straight line when not distorted, a post on said base engageable by that portion of said belt band that extends between the two ends of the said circular rim when said one-half wheel is rotated in a direction away from said ledge shoulder and a slot in said web capable of receiving said post.

6. In a rod holder, a base, a vertical shoulder ledge on said base, a substantially one-half wheel rotatably eccentrically mounted on said base and at one side of said shoulder ledge; said one-half wheel having substantially a one-half circular rim portion and a substantially one-half web, a continuous flexible resilient belt band having a portion of its length embracing said circular rim portion of said one-half wheel and its other portion extending between the two ends of said circular rim portion in substantially a straight line when not distorted, a post on said base engageable by that portion of said belt band that extends between the two ends of the said circular rim when said one-half wheel is rotated in a direction away from said ledge shoulder and an open end slot in said web capable of receiving said post.

References Cited in the file of this patent

UNITED STATES PATENTS

| 417,119 | Underwood | Dec. 10, 1889 |
| 1,306,585 | Droege et al. | June 10, 1919 |
| 2,370,876 | Richardson | Mar. 6, 1945 |